United States Patent [19]
Wright

[11] Patent Number: 5,002,371
[45] Date of Patent: Mar. 26, 1991

[54] LOW COUPLING BEAM SPLITTER AND LASER POWER OR POSITION MONITOR USING SAME

[75] Inventor: David L. Wright, Redwood City, Calif.

[73] Assignee: Spectra Physics, LPD, Mountain View, Calif.

[21] Appl. No.: 417,805

[22] Filed: Oct. 5, 1989

[51] Int. Cl.$^5$ .................. G02B 27/28; G02B 5/04; G02B 5/30

[52] U.S. Cl. ................... 350/394; 350/286; 372/100; 372/106

[58] Field of Search ............ 350/173, 394, 395, 286; 372/106, 100

[56] References Cited

U.S. PATENT DOCUMENTS

| | | | |
|---|---|---|---|
| 4,504,123 | 3/1985 | Smith | 350/394 |
| 4,509,830 | 4/1985 | Kato et al. | 350/394 |
| 4,525,034 | 6/1985 | Simmons | 350/395 |
| 4,832,469 | 5/1989 | Noguchi et al. | 372/106 |
| 4,844,584 | 7/1989 | Miyagawa | 372/106 |

OTHER PUBLICATIONS

Chatwin et al., "Efficient Laser Power and Energy Monitoring Using an Uncoated Wedge," Applied Optics, vol. 28, No. 1, Jan. 15, 1989, pp. 209–211.

*Primary Examiner*—Bruce Y. Arnold
*Assistant Examiner*—Martin Lerner
*Attorney, Agent, or Firm*—Fliesler, Dubb, Meyer & Lovejoy

[57] ABSTRACT

A low coupling beam splitter with no cross-polarization error or critical alignment tolerances is formed of a quartz piece having a first planar face in the optical path in the plane of the cross-polarization and at or near Brewster's angle to the beam. A second planar face is in the interior optical path in the plane of the cross-polarization and off of Brewster's angle to the beam, so that a majority of the component having the dominant polarization is transmitted along the optical path, while a small fraction of the component having the dominant polarization and a portion of the cross-polarized component are reflected along a first interior sample path. A third planar face is in the first interior sample path in the plane of the dominant polarization and at or near Brewster's angle to the reflected beam. Thus, a portion of the component having the dominant polarization is reflected as a sample beam, and the majority of the component having the cross-polarization is transmitted away from the sample beam. A standard photodetector can be placed in the sample path for monitoring the power or position of the beam, with no error due to the cross-polarized component.

16 Claims, 4 Drawing Sheets

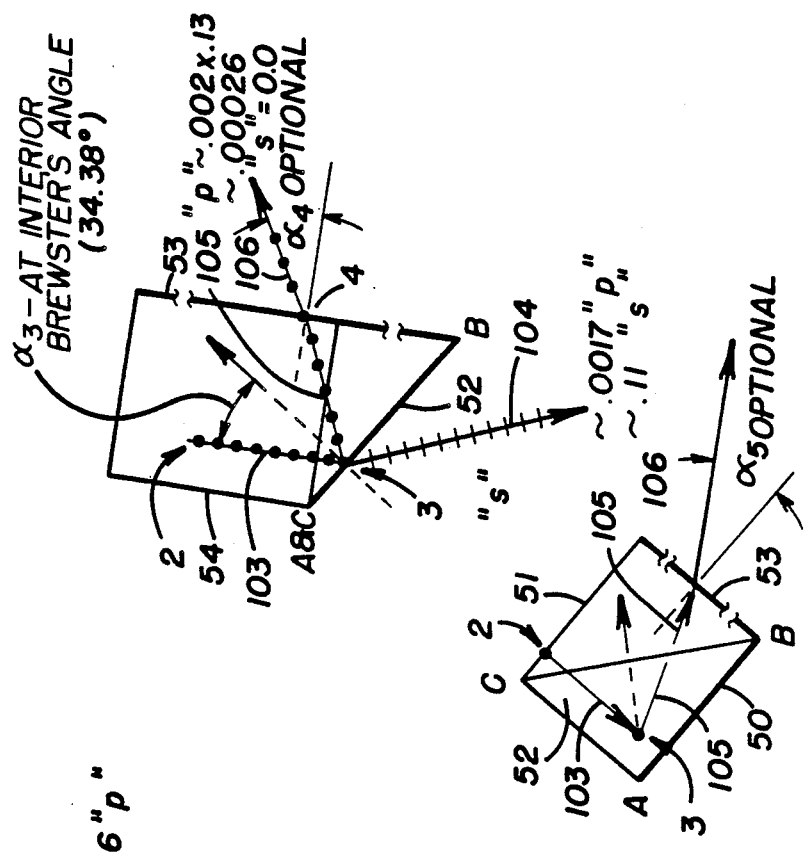

Intensity of reflected light as a function of the angle of incidence
(a) $R_\perp$; (b) $R_\parallel$

LOW COUPLING BEAM SPLITTER AND LASER POWER OR POSITION MONITOR USING SAME

FIELD OF THE INVENTION

The present invention relates to low coupling beam splitters, such as used in laser power and position monitors.

DESCRIPTION OF RELATED ART

Laser power and position monitors in the prior art have typically worked by splitting a sample of a working laser beam off the primary optical path and directing the sample into a photodetector. However, for laser beams of relatively high power, even a small percentage of the beam is sufficient to destroy most photodetectors.

Therefore, techniques for splitting off smaller and smaller fractions of the working beam have been developed. These techniques are primarily based on the small percentage of reflection near Brewster's angle of a linearly polarized beam at a dielectric interface.

One prior art example is set forth in Chatwin et al., "Efficient Laser Power and Energy Monitoring Using an Uncoated Wedge," APPLIED OPTICS, Vol. 28, No. 2, Jan. 15, 1989, pp. 209-211.

There are two problems with the prior art. The first problem is that for a high power beam with a small cross-polarized component, the cross-polarized component is more strongly reflected at the Brewster angle interface than the component having the dominant polarization. Therefore, the cross-polarized component may become a problem in the sample beam, since the magnitude of the cross-polarized component in the sample beam is enhanced relative to the dominant polarization. So the sample beam may not be a good measure of the power in the dominant polarization of the beam. And, if the cross-polarized component is large enough, then it may damage the photodetector.

The second problem is the increasing sensitivity to angular misalignment as the sample beam intensity is made very small by approaching Brewster's Angle.

Accordingly, it is desirable to have a low coupling beam splitter which is not over-sensitive to a cross-polarized component in a high powered laser beam, and is also less sensitive to misalignment, and to employ such a beam splitter in an apparatus for monitoring the beam power or position.

SUMMARY OF THE INVENTION

The present invention provides an apparatus for splitting a beam of radiation, that is not oversensitive to a cross-polarized component or to angular alignment tolerances. Further, it provides for a very low coupling of the power of the beam, and it can be used in systems monitoring the power or position of very high power laser beams.

The invention comprises a piece of material that has very low absorption at the wavelength of the beam. A suitable material for the visible range is fused quartz. As in the prior art, the piece of material has a first planar face disposed in the optical path orthogonal to the direction of the beam in the cross-polarized axis and at an angle at, or near, Brewster's angle to the beam in the polarized axis, so that virtually all of the component of the beam having the dominant polarization (and some of the component of the beam having the cross-polarization) are transmitted along a first interior optical path inside the piece. A second planar face is disposed in the first interior optical path orthogonal to the direction of the beam in the cross-polarization, and at a second angle that is intentionally slightly off of Brewster's angle for the polarized axis, so that the great majority of the component having the dominant polarization is transmitted through the second surface, while a small fraction of the component having the dominant polarization is reflected along the first interior sample path. Along with the component having the dominant polarization, a portion of the component having the cross-polarization is reflected as well along the first interior sample path.

A third planar face is disposed in the first interior sample path orthogonal to the direction of the beam in the dominant direction of polarization, but at the Brewster's angle for the cross-polarized component of the reflected beam. Thus, a further attenuated portion of the component having the dominant polarization is reflected as an interior sample beam along a second interior sample path, and virtually all of the component having the cross-polarization is transmitted through the third surface, away from the second interior sample path. A fourth planar face on the piece is disposed in the second interior sample path, so that at least some of the interior sample beam is transmitted out as a sample of the beam.

A standard photodetector and/or quad cell ca be placed in the sample path for monitoring the power and/or position of the beam, with no sensitivity to the cross-polarized component.

Thus, according to another aspect, the present invention is an apparatus for monitoring a characteristic, such as power or position, of a beam of radiation propagating along a primary optical path. The apparatus comprises a beam splitter mounted in the optical path for splitting a sample beam from the beam, the sample beam consisting of less than one percent of the component of the beam having the dominant polarization and less than one percent of the component of the beam having the cross-polarization. Also, a detector is mounted in the path of the sample beam and responsive to the sample beam for generating a signal indicating a characteristic of the beam of radiation.

Other aspects and advantages of the invention can be seen upon review of the drawings, the specification and the claims which follow.

BRIEF DESCRIPTION OF THE FIGURES

FIG. 3 is a side view of the beam splitter, according to a preferred embodiment.

FIG. 4 is a projection of the beam splitter of FIG. 3 taken along the line A-C of FIG. 3.

FIG. 5 is a projection of the beam splitter of FIG. 3 taken from the end of the piece.

DETAILED DESCRIPTION

Figure 6:
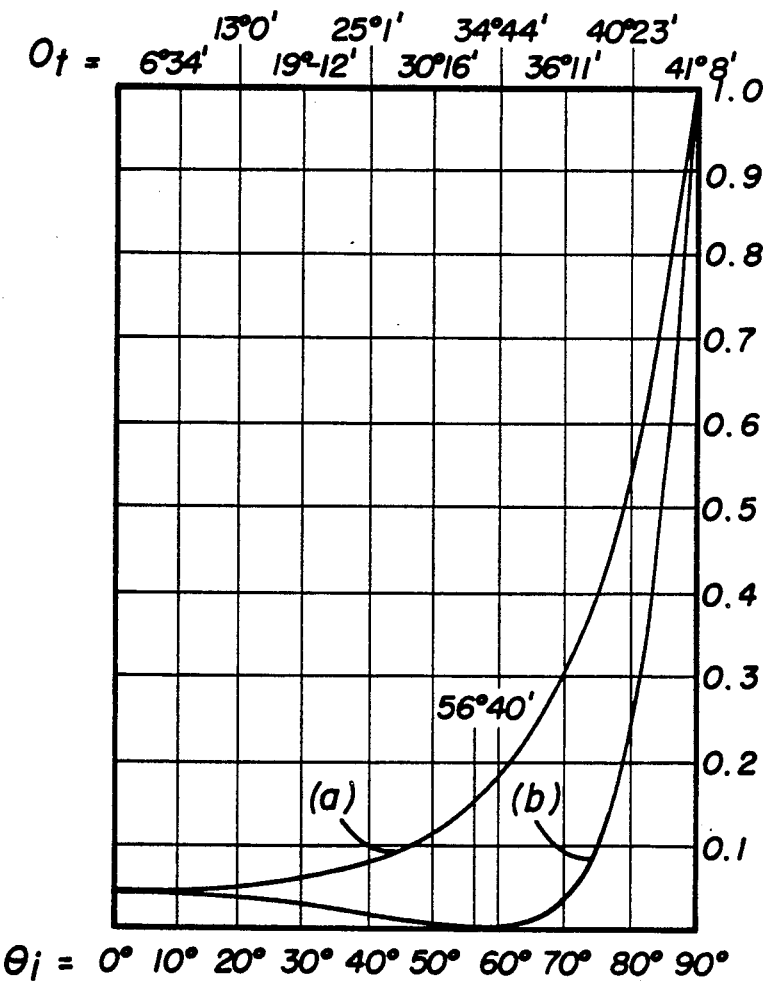
FIG. 6 is a graph showing the intensity of reflected light as a function of angle of incidence for fused quartz in air.

A detailed description of a preferred embodiment of the present invention is described with reference to FIGS. 1–6. FIG. shows use of the beam splitter, according to the present invention, in a laser beam power or position monitoring device. FIGS. 2–5 are used to illustrate a dominant embodiment of the beam splitter. FIG. 6 is a graph showing reflection of dominant and cross-polarized components at an air-to-fused quartz interface.

Figure 1:
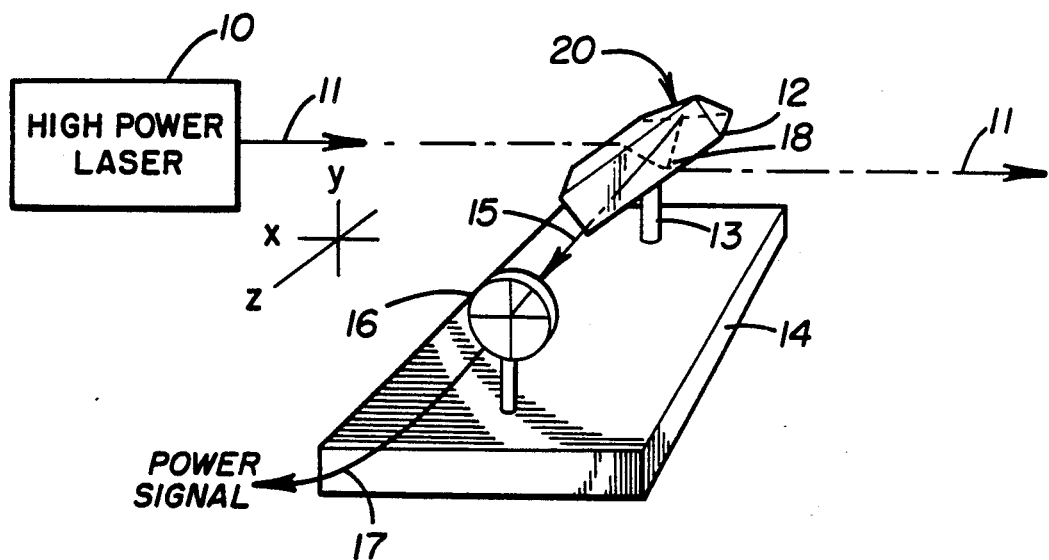
FIG. 1 is a schematic diagram of an apparatus for monitoring laser power or position, with a beam splitter according to the present invention.

As shown in FIG. 1, a high power laser 10 generates a working beam of radiation along an optical path. The beam 11 has a first component which is plane polarized at a dominant polarization and a second component which is plane polarized at a cross-polarization. A beam splitter 12 is disposed in the optical path by mounting on support 13 coupled to base 14. The beam splitter splits a sample 15 of the beam 11 off of the optical path and directs it along a sample path. A power and/or position detector 16 is disposed in the sample path for generating an output signal on line 17 which indicates the power and/or position of the beam 11.

In the embodiment shown in FIG. 1, the entry face 21 of the beam splitter 12 does not contribute significantly to the splitting function.

The back face of the beam splitter comprises a first dielectric interface 18 disposed slightly off Brewster's angle for the dominant polarization and parallel to the cross-polarization so that a majority of the beam 11 is transmitted along the optical path and a portion is reflected along path 19. The portion reflected along path 19 includes a small part of the component of the beam having the dominant polarization and a larger part of the component of the beam 11 having the cross-polarization.

The beam splitter has an inclined face which comprises a second dielectric interface 20 disposed in the path of the portion 19 at exactly Brewster's angle for the cross-polarized component and parallel to the dominant polarization component. The sample 15 is reflected off of the second dielectric interface 20 along the sample path. The sample 15 consists of a twice-reflected portion of the dominant polarization component of the beam and very little, or none, of the cross-polarization component.

Therefore, the power or position detector 16 is not sensitive to the cross-polarized component in the beam 11 and provides a true signal indicating the power and/or position of the beam 11. Furthermore, a very small fraction of the beam 11 can be sampled using this apparatus without stringent alignment requirements, making the system suitable for very high power laser systems.

Figure 2A:
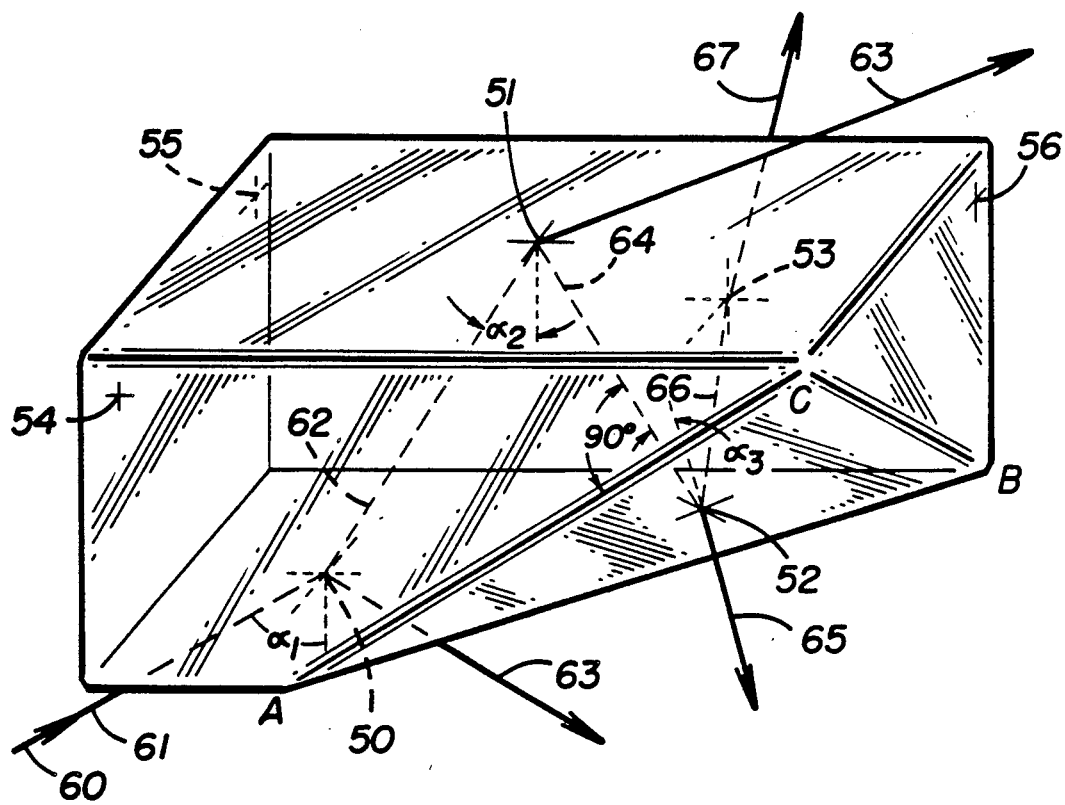
FIG. 2 is a perspective view of the beam splitter illustrating the paths of the beams.
FIG. 2B is a perspective view of the beam splitter illustrating the paths of the beams from a perspective different from FIG. 2A.

FIG. 2A provides an expanded perspective view of the beam splitter, according to the present invention. In the perspective shown in FIG. 2A, it can be seen that the beam splitter consists of a piece of material which has very low absorption at the wavelength of the beam. It is therefore essentially transparent to the beam. The piece of material has a bottom face 50, a top face 51, an inclined face 52, and a back face 53. Also, the piece has a front face 54, a left side face 55, and a right side face 56.

The beam splitter is disposed in the optical path of a beam 60 of radiation. The beam 60 includes a first component having a dominant polarization and a second component having a cross-polarization.

The piece is disposed in the exterior optical path 61 of the beam 60 so that the bottom face is parallel to the cross-polarization and at an angle $\alpha_1$ to the dominant polarization at the beam. The majority of the beam is transmitted along an interior path 62, while a small portion of the beam may be reflected along an exterior path 63 depending on whether $\alpha_1$ is at Brewster's angle or not. That portion of the beam reflected along the exterior path 63 is wasted power, or may be used with slow, high power detectors for cross-calibration purposes.

The top face 51 is disposed in the interior optical path 62 at slightly off of the interior Brewster angle $\alpha_2$ so that a majority of the beam is transmitted along an exterior optical path 63. A portion of the beam is reflected along a first interior sample path 64. The portion reflected along the first interior sample path 64 includes a small sample of the component having the dominant polarization and a portion of the component having the cross-polarization.

The inclined face 52 is disposed in the interior reflection path 64 parallel to the dominant polarization component, and at angle $\alpha_3$, which is at the interior Brewster's angle with respect to the cross-polarized component. Thus, almost all of the cross-polarization component is transmitted along exterior path 65 and a portion of the dominant polarization is reflected along a second interior sample path 66.

The back face 53 is disposed in the second interior sample path 66 so that at least a portion of the dominant polarization component propagating along the second interior sample path 66 is transmitted along exterior sample path 67.

For one example, in a beam splitter consisting of fused quartz having a parallel bottom face 50 and top face 51, $\alpha_1$ is approximately 50.4° for a reflection of the dominant polarization component of approximately 0.2 percent and of the cross-polarization component of approximately 13 percent. The angle $\alpha_2$ is 31.82°, for reflection of approximately 0.2 percent of the dominant polarization along the first interior sample path 64 and 11 percent of the cross-polarization component. Thus, 99.6 percent of the dominant polarization component is transmitted along the exterior optical path 63.

The angle $\alpha_3$ is set at the interior Brewster's angle of 34.38° for rejection of the cross-polarization component in the sample beam.

In alternative implementations, the angle $\alpha_1$ may be set at precisely the exterior Brewster's angle of 56.67° so that the bottom face and top face are not parallel. Utilizing this wedge approach, the wasted power in the dominant polarization transmitted along the exterior path 63 in the embodiment of FIG. 2 is eliminated.

In another alternative, the angle $\alpha_3$ could be arranged so that the percentage of the cross-polarization in the sample beam 67 matches the percentage of the cross-polarization in the working beam 60.

In these implementations, considerably less than 0.1 percent of the dominant polarization component can be sampled without cross-polarization sensitivity depending on construction and alignment accuracy.

In yet another alternative, the back face can be disposed at any angle desired in order to direct the sample beam 67.

Figure 2B:
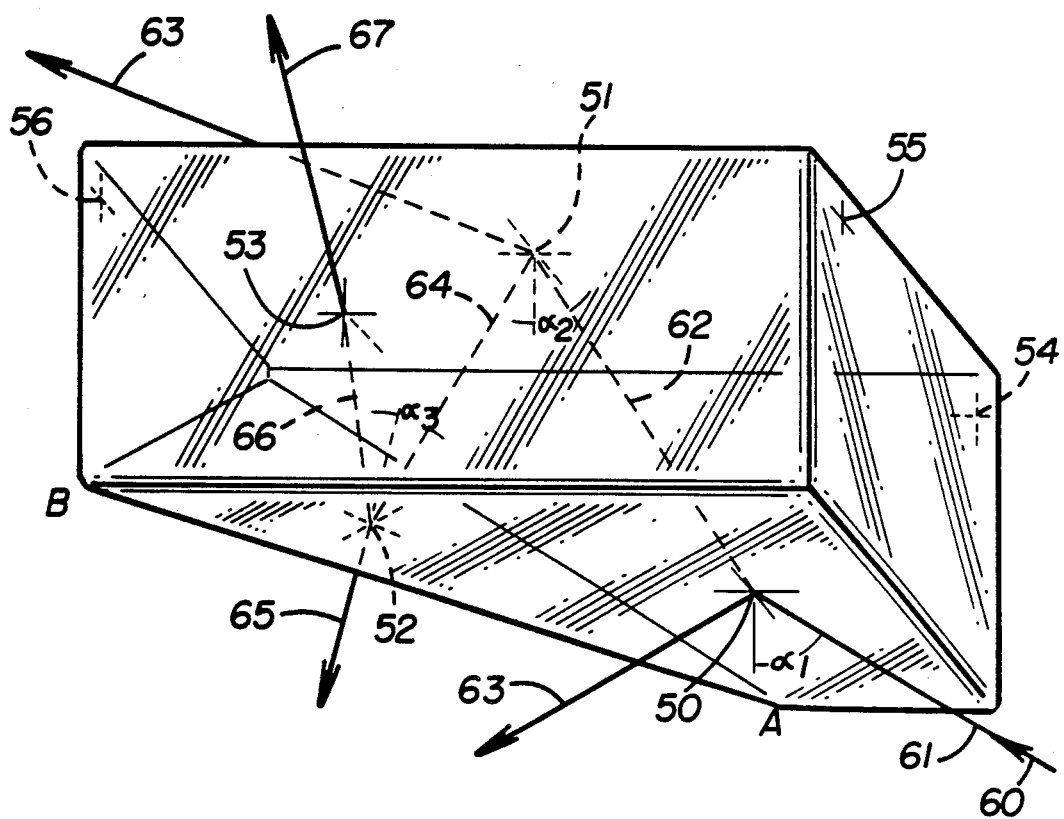

In FIG. 2A, the three corners of the inclined face 52 are labeled A, B, C. It can be seen, as shown in FIG. 3, that the line A–C is at a right angle to the reflected beam along path 64. FIG. 2B is a drawing of the beam splitter of FIG. 2A from the perspective in which the input beam 60 intersects face 50 in a plane substantially parallel to the plane of the paper, while the sample output beam 67 exits face 53 with a direction of propagation coming out of the paper, where face 53 is parallel to the plane of the paper. The reference numbers in FIG. 2B are the same as used in FIG. 2A for consistency, and will not be described again herein. This rotated perspective is meant to aid in understanding the shape of the piece of fused quartz.

A more complete specification of the shape of the beam splitter is shown in FIGS. 3–5, where FIG. 3 is a side view looking in at the front face 54. In the embodiment shown in FIG. 3, the bottom face 50 and the top face 51 are parallel. The incoming beam 100 of radiation has dominant polarization P as indicated by the crosslines on the beam 100, and strikes the piece at point 1. The bottom face 50 is disposed orthogonal to the dominant polarization P and at an angle $\alpha_1$ which is off Brewster's angle at approximately 50.4° for the embodiment illustrated. The majority of the beam is transmitted along path 101 to the top face at point 2 at angle $\alpha_2$, where the majority is transmitted as the transmitted beam on line 102. A portion is reflected along a first interior sample path 103 to the inclined face 52 where it strikes at point 3 at angle $\alpha_3$.

As illustrated in FIG. 3, the dominant polarization of the beam dominates the magnitude of the power of the working beam 60. However, there is a small cross-polarization which is enhanced along the first interior sample path 103 due to the reflection at point 2.

The interior angle $\alpha_2$ is set at 31.82° for a reflection of the dominant polarization component of approximately 0.2 percent. The first interior sample path 103 is at 90° with respect to the line A–C at the corners of the inclined face 52.

FIG. 4 shows a projection of the beam splitter looking orthogonal to the plane of incidence of the reflected beam 103 on the inclined face 52. Along this projection, the dominant polarization is perpendicular to the plane of the drawing and so is illustrated as dots along the optical path 103. It can be seen that the inclined face 52 is disposed parallel to the dominant polarization, and at angle $\alpha_3$, which is equal to the interior Brewster's angle of 34.38°, to the cross-polarization. Thus, essentially all of the cross-polarization component is transmitted along the exterior path 104 and a small sample (approximately 0.026 percent) of the dominant polarization is transmitted along a second interior sample path 105.

The back face 53 is disposed in the second interior sample path 105 at an angle $\alpha_4$. This angle can be set at any desired angle depending on the direction that the sample path 106 outside the beam splitter should take, according to a specific implementation.

Again, this embodiment rejects essentially all of the cross-polarization component in the sample beam propagating along path 106. If it is desired to obtain a power measurement for both the preferred and cross-polarizations without enhancing the cross-polarization, then the angle $\alpha_3$ should be set so the net "S" reflections equal the net "P" reflections of all surfaces, this occurs approximately at $\alpha_3 = \alpha_2$.

FIG. 5 illustrates a projection of the beam splitter of FIG. 3, looking in the right side face 56. It can be seen that the first interior sample path 103 extends from point 2 on the top face 51 to point 3 on the inclined face 52. From point 3 on the inclined face 52, the second interior sample path 105 extends to point 4 on the back face 53.

The angle $\alpha_5$ in this projection that the exterior sample path 106 makes with the back face 53 is again optional, depending on the direction of the sample beam needed for a particular implementation.

FIG. 6 is a graph showing the intensity of reflected light as a function of an exterior angle of incidence for a fused quartz in air, dielectric interface. Trace (a) illustrates the magnitude of the reflected cross-polarization. Trace (b) illustrates the magnitude of the reflection of the dominant polarization. It can be seen that in a relatively wide range off of the exterior Brewster's angle at 56° 40', the dominant polarization has a very small reflected component while the cross-polarization is significantly reflected. This illustrates the problem associated with the prior art beam splitters in which a single reflection at a dielectric interface is used. With a single reflection, the cross-polarization component (trace (a)) is enhanced in the reflected beam relative to the dominant polarization (trace(b)).

According to the present invention, using a first reflection at a first dielectric interface (top face 51) off of Brewster's angle to reflect a small portion of the dominant polarization along a sample path, and a second reflection at a second dielectric interface (inclined face 52) disposed along the reflected path at near Brewster's angle to reject the cross-polarization component, a much improved beam splitter is provided.

Therefore, an apparatus for monitoring the power and/or position of a high power laser beam is provided that is not over-sensitive to the cross-polarization component and does not enhance that component in the sample beam.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An article of manufacture for splitting a beam of radiation propogating along an exterior optical path, the beam having a first component having a dominant polarization and a second component having a cross-polarization, to direct a sample of the beam along a sample path, comprising a piece of material essentially transparent to the beam, the piece of material having:

a first planar face disposed in the exterior optical path in the plane of the cross-polarization and at a first angle to the dominant polarization, so that most of the first component and some of the second component are transmitted along an interior optical path;

a second planar face disposed in the interior optical path in the plane of the cross-polarization and at a second angle to the dominant polarization, so that a majority of the first component is transmitted along the exterior optical path, a minority of the first component is reflected, and a portion of the second component is reflected, wherein the minority of the first component and the portion of the second component form a reflected beam propagating along a first interior sample path;

a third planar face disposed in the first interior sample path in the plane of the dominant polarization and at a third angle to the cross-polarization in the reflected beam, so that a portion of the first component is reflected as an interior sample beam along a second interior sample path, and a majority the second component in the reflected beam is transmitted away from the second interior sample path; and a fourth planar face disposed in the second interior sample path so that at least some of the interior sample beam is transmitted as the sample of the beam along the sample path.

2. The article of claim 1, wherein the second angle is off Brewster's angle so that less than one percent of the first component is reflected along the first interior sample path.

3. The article of claim 1, wherein the third angle is near Brewster's angle so that more than ninety-nine percent of the portion of the second component in the reflected beam is transmitted away from the second interior sample path.

4. The article of claim 1, wherein the first component has a first power level and the second component has a second power level, and the first power level is at least ten times as great as the second power level.

5. The article of claim 1, wherein the first angle is near Brewster's angle so that more than ninety-nine percent of the first component in the beam is transmitted along the interior optical path.

6. The article of claim 1, wherein the piece of material comprises fused quartz.

7. The article of claim 1, wherein the second and third angles are selected such that the sample beam includes the first and second components in essentially the same proportions as the beam being sampled.

8. A low coupling beam splitter for splitting a beam of essentially polarized radiation propagating along an exterior optical path, the beam having a first component having a dominant polarization and a second component having a cross-polarization, to direct a sample of the first component along a sample path, comprising a piece of fused quartz, the piece having:

a first planar face disposed in the exterior optical path in the plane of the cross-polarization and near Brewster's angle to the dominant polarization, so that most of the first component and some of the second component are transmitted along an interior optical path;

a second planar face disposed in the interior optical path in the plane of the cross-polarization and near, but off, Brewster's angle to the dominant polarization, so that a majority of the first component is transmitted along the exterior optical path, a minority of the first component is reflected, and a portion of the second component is reflected, wherein the minority of the first component and the portion of the second component form a reflected beam propagating along a first interior sample path;

a third planar face disposed in the first interior sample path in the plane of the dominant polarization and near Brewster's angle to the cross-polarization in the reflected beam, so that a portion of the first component is reflected as an interior sample beam along a second interior sample path, and a majority the second component in the reflected beam is transmitted away from the second interior sample path; and a fourth planar face disposed in the second interior sample path so that at least some of the interior sample beam is transmitted as the sample of the first component along the sample path.

9. The beam splitter of claim 8, wherein less than one percent of the first component is reflected at the second face along the interior reflection path.

10. The beam splitter of claim 8, wherein more than ninety-nine percent of the portion of the second component in the beam is transmitted at the third face away from the interior sample path.

11. The beam splitter of claim 8, wherein the first component has a first power level and the second component has a second power level, and the first power level is at least ten times as great as the second power level.

12. An apparatus for monitoring a characteristic of a beam of radiation propagating along a primary optical path, the beam having a first component having the dominant polarization and a second component having a cross-polarization, comprising:

means, mounted in the primary optical path, for splitting a sample beam from the beam, the sample beam consisting of less than 0.1 percent of the first component and less than 0.1 percent of the second component; and means, mounted to receive the beam sample and responsive to the sample beam, for generating a signal indicating the characteristic of the beam.

13. The apparatus of claim 12, wherein the means for splitting includes:

first means, disposed in the primary optical path, for transmitting a majority of the first component along the primary optical path, and for reflecting a minority of the first component and a portion of the second component, wherein the minority of the first component and the portion of the second component form a reflected beam propagating along a first sample path;

second means, disposed in the first sample path, for reflecting a sample of the first component along a second sample path, and for transmitting a majority of the portion of the second component away from the second sample path.

14. The apparatus of claim 12, wherein the means for splitting includes a piece of material essentially transparent to the beam, the piece of material having:

a first planar face disposed in the primary optical path in the plane of the cross-polarization and at a first angle to the dominant polarization, so that most of the first component and some of the second component are transmitted along an interior optical path;

a second planar face disposed in the interior optical path in the plane of the cross-polarization and at a second angle to the dominant polarization, so that a majority of the first component is transmitted along the exterior optical path, a minority of the first component is reflected, and a portion of the second component is reflected, wherein the minority of the first component and the portion of the second component form a reflected beam: propagating along a first interior sample path;

a third planar face disposed in the first interior sample path in the plane of the dominant polarization and at a third angle to the cross-polarization in the reflected beam, so that a portion of the first component is reflected as an interior sample beam along a second interior sample path, and a majority the second component in the reflected beam is transmitted away from the second interior sample path; and a fourth planar face disposed in the interior sample path so that at least some of the interior sample beam is transmitted as the sample of the first component.

15. The article of claim 14, wherein the second and third angles are selected such that the sample beam includes the first and second components in essentially the same proportions as the beam being sampled.

16. The apparatus of claim 12, wherein the means for splitting includes a piece of fused quartz, the piece having:

a first planar face disposed in the primary optical path in the plane of the cross-polarization and at or near Brewster's angle to the dominant polarization, so that most of the first component and some of the second component are transmitted along an interior optical path;

a second planar face disposed in the interior optical path in the plane of the cross-polarization and near but off Brewster's angle to the dominant polarization, so that a majority of the first component is transmitted along the primary optical path, a minority of the first component is reflected, and a portion of the second component is reflected, wherein the minority of the first component and the portion of the second component form a reflected beam propagating along a first interior sample path;

a third planar face disposed in the first interior sample path in the plane of the dominant polarization and at or near Brewster's angle to the cross-polarization in the reflected beam, so that a portion of the first component is reflected as a second interior sample beam along an interior sample path, and a majority the second component in the reflected beam is transmitted away from the second interior sample path; and a fourth planar face disposed in the second interior sample path so that at least some of the interior sample beam is transmitted as the sample of the first component.

* * * * *